(12) United States Patent
Shabtay et al.

(10) Patent No.: US 6,724,734 B1
(45) Date of Patent: Apr. 20, 2004

(54) CREATING A SPANNING TREE OF A NETWORK INCLUDING CLUSTERS

(75) Inventors: Lior Shabtay, Ganei Tikva (IL); Benny Rodrig, Lexington, MA (US)

(73) Assignee: Avaya Communication Israel, Ltd., Tel Aviv (IL)

( * ) Notice: Subject to any disclaimer, the term of this patent is extended or adjusted under 35 U.S.C. 154(b) by 0 days.

(21) Appl. No.: 09/333,403

(22) Filed: Jun. 15, 1999

(51) Int. Cl.[7] .............................................. H04L 12/28
(52) U.S. Cl. ....................................... 370/254; 370/255
(58) Field of Search ................................ 370/256, 255, 370/254

(56) References Cited

U.S. PATENT DOCUMENTS

| | | | | |
|---|---|---|---|---|
| 5,315,592 A | * | 5/1994 | Conant et al. | 370/401 |
| 5,734,824 A | * | 3/1998 | Choi | 370/254 |
| 5,764,636 A | * | 6/1998 | Edsall | 370/256 |
| 5,878,232 A | | 3/1999 | Marimuthu | |
| 5,926,463 A | * | 7/1999 | Ahearn et al. | 370/254 |
| 6,032,194 A | * | 2/2000 | Gai et al. | 340/2.1 |
| 6,163,543 A | * | 12/2000 | Chin et al. | 370/216 |
| 6,304,575 B1 | * | 10/2001 | Carroll et al. | 370/408 |
| 6,327,252 B1 | * | 12/2001 | Silton et al. | 370/256 |

OTHER PUBLICATIONS

"IEEE P802.1s/D2—Draft Supplement to IEEE Standard P802.1Q—1999, Draft Supplement to Virtual Bridged Local Area Networks: Multiple Spanning Trees", 1999. pp. i–iv, 1–19,21.

White Paper #1 of Lucent Cajun P550 Switch, pp. 1, 18, Oct. 1997.

"Information technology—Telecommunications and information exchange between systems—Local and metropolitan area networks—Media access control (MAC) bridges", International Standard ISO/IEC 15802-3, 1998, ANSI/IEEE Std 802.1D, 1998 edition. pp. i–xix, 58–121 and 280–287.

"Draft Standard P802.1Q/D9, IEEE Standards for Local and Metropolitan Area Networks: Virtual Bridged Local Area Networks", 1998. pp. 1–87.

Casale,S. et al.; "A Multiple Spanning Tree Protocol in Bridged LANs;" Information Processing89; Edited by Ritter, G. X.; Aug. 28–Sep. 1989; Proceedings of the IFIP 11th World Computer Congress San Francisco USA; pp. 633–638.

* cited by examiner

Primary Examiner—Wellington Chin
Assistant Examiner—William Schultz

(57) ABSTRACT

A method of implementing a distributed algorithm which is based on sending Bridge Protocol Data Units (BPDUs) only between neighboring bridging-devices in a network. The method includes sending BPDUs from a first bridging-device of the network to at least one non-neighboring second bridging-device, and determining a characteristic of the network responsive to the BPDUs.

41 Claims, 5 Drawing Sheets

CREATING A SPANNING TREE OF A NETWORK INCLUDING CLUSTERS

FIELD OF THE INVENTION

The present invention relates to communication networks and in particular to spanning tree algorithms for local networks.

BACKGROUND OF THE INVENTION

A local communication network comprises a plurality of bridging-devices and communication links. Each communication link connects between two or more bridging-devices or between a bridging-device and a non-bridging device, such as an end-station (e.g., a computer), a router or a server. Each bridging-device comprises a plurality of ports which serve as interfaces between the bridging-device and the links to which it is connected. Each port may be active (referred to also as forwarding), blocking or disconnected, for reasons described below. When a source station sends a message to a destination station, the source station sends the message to a nearest bridging-device which sends the message to one of its neighboring bridging-devices (bridging-devices which are directly connected to a common link are referred to herein as neighbors). The neighboring bridging-device passes the message to another bridging-device until the message finally reaches the bridging-device connected to the destination station. In many cases, messages are broadcast to all the bridging-devices in a local network. When a message is broadcast, each bridging-device passes the message through all of its active ports, except for the port through which it was received. This broadcast scheme operates properly only if the active ports do not form a loop in the network. If the network includes a loop of active ports, a single message may be repeatedly sent through the network and the network will fail. A topology of active ports which connects all the bridging-devices in a network without forming loops is referred to as a spanning tree.

In many cases redundant links are added to networks to be used in case one or more of the bridging-devices and/or links fail. To properly use these redundant links instead of the bridging-devices and/or links which failed there is a need for a method for blocking and activating the ports of the various bridging-devices of the network. The method must ensure that a loop is never formed in the network and a spanning tree of active ports is available as often as possible. One common algorithm which performs these tasks is the 802.1D standard spanning tree algorithm (STA) which is described in "Information technology Telecommunications and information exchange between systems—Local and metropolitan area networks—Media access control (MAC) bridges", International Standard ISO/IEC 15802-3, 1998, ANSI/IEEE Std 802.1D, 1998 edition, the disclosure of which is incorporated herein by reference.

The 802.1D STA is a distributed algorithm, i.e., it is performed separately by a STA software package in each of the bridging-devices of the network. In most cases, no single bridging-device knows the entire topology of the spanning tree. Rather, each bridging-device decides which of its local ports are part of the spanning tree according to predetermined rules and information received from neighboring bridging-devices. Each bridging-device activates its ports accordingly.

According to the 802.1D STA each bridging-device has a unique identifier which represents the priority of the bridging-device. A root bridging-device is chosen as the bridging-device with the lowest priority. The spanning tree is built as a distance-vector tree around the root, according to link costs associated with the links of the network. Each bridging-device designates one of its ports, which leads to the root along a lowest cost path, as a root port. If two paths to the root have the same cost, the path leading through the neighboring bridging-device with the lowest priority determines the root port. In addition, for each link, one of the ports leading to the link is chosen as a designated port of the link. The designated port of the link is chosen as the port of the bridging-device which has a shortest path from the root. Therefore, the designated ports are never root ports. The bridging-devices activate their designated ports and root port and keep all their other ports blocked. It is noted that messages (except control messages described below) pass from a first bridging-device to a second bridging-device over a link only if the ports of both the first and second bridging-devices leading to the link are active.

The operation of the algorithm is based on exchanging STA update messages (referred to as Bridge Protocol data Units—BPDUs) on the state of the network between bridging-devices which are neighbors. The STA BPDUs are sent also through blocking ports, unlike all other messages which are not passed through blocking ports. The BPDUs are identified by receiving bridge devices, either in hardware or software, according to a special destination address which they have. The receiving bridging-device passes the BPDUs to the STA software within the bridging-device and does not forward the BPDU to any other port. Thus, it is ensured that BPDUs are exchanged only between neighboring bridging devices.

The STA software in each bridging-device keeps track of the following parameters:
1) a current supposed ID of the root,
2) a current cost of the shortest path to the current supposed root,
3) a current supposed root port, and
4) a list of local ports which serve as designated ports for their associated links.

These parameters are updated according to received BPDUs, and are used to send updated BPDUs to neighboring bridging-devices. With time, information on the network propagates throughout the bridging-devices of the network and the tree is properly formed. It is noted that between sending a BPDU and sending out an updated BPDU (as a result of new information, for example), the bridging-device waits for a hold-time of a second in order to prevent inaccurate information from spreading throughout the network before the information is corrected. It is possible to change the hold-time to shorter or longer periods, for example to half a second, in some or all of the bridging-devices.

The time required by the 802.1D STA to converge after a change in the network (e.g., failing of a link) is relatively long (many seconds). The convergence time is dependent on the diameter of the network, i.e., the largest number of bridging-devices a message passes in passing between two bridging-devices. With default time-out parameters, the standard 802.1D STA is also limited to networks with a diameter smaller than or equal to seven.

A manager of a network may set a port to a disconnected state, in which the port does not forward any messages, and does not participate in a spanning tree. Usually, a port is set as disconnected by shutting down its hardware. Some bridging devices automatically set a port to the disconnected state if they sense that the port is not connected to any other device and/or if the port is faulty or is connected to a faulty link or device. When a disconnected port begins to operate, it is set to blocking state, and the STA adjusts accordingly.

Use of the standard 802.1D STA allows a user to connect bridging-devices from different manufacturers to a single network. Any deviations from the standard algorithm must be transparent to the bridging-devices of the network in which the changes were not performed.

Many modern LAN bridging-devices support a feature named virtual local area networks (VLANs). Some or all of the messages sent through the network are given a VLAN ID which represents the VLAN to which the messages belong. The ports of the bridging-devices of the network are configured as active or blocking for each VLAN separately. VLANs allow a single physical network to operate as a plurality of independent networks. For example, a station may be connected to a network through a port in which only a VLAN X is enabled. The station therefore can only forward packets to, and receive packets from, stations which are connected to VLAN X. An emerging standard for VLANs is described in "Draft Standard P802.1Q/D9, IEEE Standards for Local and Metropolitan Area Networks: Virtual Bridged Local Area Networks", 1998, the disclosure of which is incorporated herein by reference.

In some cases it is desired to define a cluster of bridging-devices which perform some tasks as if the bridging-devices of the cluster comprise a single bridging-device. For example, instead of using a single large switch, a user may use a stacked switch which is formed of a cluster of switches. The cluster of switches is more modular and flexible in its attributes as compared to a single switch. In the eyes of the user, who is not interested in the number of switches through which a packet passes, the stacked switch operates like a single switch.

A simple application of the 802.1D STA on a network which includes one or more clusters, ignores the clustering and relates to the bridging-devices of the clusters as to all other bridging-devices. However, ignoring the clustering enlarges the diameter of the network and therefore lengthens the convergence time of the algorithm. The extra time required for convergence may require changes in the time-out parameters of the algorithm in all the bridging-devices of the network. In some bridging-devices it may be impossible to perform these changes. Furthermore, the 802.1D STA may create a spanning tree in which one or more of the links internal to the cluster are blocked. Such a spanning tree defeats the purpose of clustering and is therefore undesirable.

One solution to this problem is to have a single bridging-device represent all the bridging-devices of the cluster in performing the algorithm. This requires a method of assigning the single bridging-device which represents the cluster. The assigning method must take into account the possibility that the assigned bridging-device may fail and another bridging-device must be assigned. This may require reinitiating the entire spanning tree algorithm, although from the point of view of the bridging-devices outside of the cluster nothing has changed. In addition, the assigned bridging-device must receive the BPDUs from all the bridging-devices in the network and must send the BPDUs it generates to specific ports of specific bridging-devices of the cluster. Furthermore, the assigned bridging-device must have control of the status of all the bridging-devices in the cluster and must receive operational status information from all the bridging-devices in the cluster. Therefore, this solution is very complicated and undesirable.

SUMMARY OF THE INVENTION

It is an object of some preferred embodiments of the invention to provide a method for implementing a spanning tree algorithm (STA) in each of the bridging-devices of a cluster, such that the algorithm converges in substantially the same amount of time as it would if the cluster were a single bridging-device. Preferably, the implementation of the present invention is totally compatible with other implementations which appear in other bridging-devices of the network.

It is an object of some preferred embodiments of the invention to provide a method for running a STA in a network including a cluster such that the algorithm converges in substantially the same amount of time as it would if the cluster were a single bridging-device, without altering the software implementing the STA.

It is an object of some preferred embodiments of the invention to provide a method for implementing a spanning tree algorithm (STA) in each of the bridging-devices of a cluster, such that the algorithm does not block internal links of the cluster. Stated otherwise, the method does not allow formation outside of the cluster of an unblocked path between two bridging-devices of the cluster.

One aspect of some preferred embodiments of the present invention relates to having the STA code in bridging-devices within a cluster (referred to herein as cluster bridging-devices) operate as if the cluster bridging-devices are connected via a single emulated link. In addition, all the cluster bridging-devices are preferably forced to choose the same lowest cost path to the root so that none of the cluster bridging-devices chooses to block its port to the emulated link.

Preferably, the cluster bridging-devices are led to act as if they are connected by a single emulated link, by having each cluster bridging-device send BPDUs to all the cluster bridging-devices and not only to those cluster bridging-devices which are actually neighbors. The BPDUs received by a cluster bridging-device from another cluster bridging-device are provided to the STA code in the receiving cluster bridging-device (or are related to by the STA code) as arriving through a single emulated port. A convenient method for performing the above process is in defining a Virtual LAN (VLAN), which includes all the bridging-devices of the cluster, and sending the internal BPDUs along the VLAN, with an altered destination MAC-address. Preferably, the altered address comprises a broadcast or multicast address. Alternatively, the altered address comprises an unknown unicast address which does not belong to any of the devices in the network, and therefore the BPDU message is handled like a broadcast message.

By having all the bridging-devices of the cluster operate as if they are connected to a single link, the decisions made by the STA software in each of the bridging-devices of the cluster are performed under the (incorrect) assumption that all the members of the cluster are mutual neighbors.

Preferably, the cluster bridging-devices are forced to choose the same root path by assigning a zero cost to the emulated link. In addition, in case there are equal-cost paths to the root from two or more bridging-devices of the cluster, the STA code of all the bridging-devices are forced to choose the same path. Preferably, when two or more paths have equal cost, the STA chooses the path through the bridging-device which has the designated port of the emulated link.

By forcing the cluster bridging-devices to choose the same root path, it is ensured that the emulated port of each cluster bridging-device is always part of the spanning-tree. Thus, the STA code does not set the emulated port to blocking state, except possibly for a short period at startup.

In a preferred embodiment of the present invention, the cluster bridging-devices activate their ports which lead to other cluster bridging-devices immediately at startup. Thus, the ports may be used to send and receive BPDUs although the BPDUs do not have a BPDU destination address.

In some preferred embodiments of the present invention, the hold-time kept by cluster bridging-devices between sending consecutive BPDUs is reduced to half a second, rather than the standard full second. Information propagating through the network and passing through a cluster is delayed at most twice within the cluster. The information is delayed for a first hold-time at the cluster bridging-device which receives the information and for a second hold-time at any other bridging-device of the cluster, since information received by a cluster bridging-device is passed to all the other cluster bridging-devices. Using a hold-time of half a second in the cluster bridging-devices results in a total delay in the cluster of up to a second, substantially the same as the hold-time in a regular bridging-device.

Alternatively or additionally, the cluster bridging-devices use different hold-times for different BPDUs they generate and/or receive. Preferably, BPDUs sent to and/or received from other cluster bridging-devices are delayed for a hold-time of half a second while other BPDUs are delayed for a full second.

In some preferred embodiments of the present invention, the above required changes are performed without altering the software which performs the STA. Preferably, an intermediate software changes the contents of the BPDUs received by the STA software so that the software operates as desired. Alternatively, the implementation of the STA in the cluster bridging-devices is altered.

There is therefore provided in accordance with a preferred embodiment of the present invention, a method of implementing a distributed algorithm which is based on sending Bridge Protocol Data Units (BPDUs) only between neighboring bridging-devices in a network, including sending BPDUs from a first bridging-device of the network to at least one non-neighboring second bridging-device, and determining a characteristic of the network responsive to the BPDUs.

Preferably, the network includes at least one cluster having cluster member bridging-devices and sending the BPDUs includes sending BPDUs from a cluster member bridging-device to substantially all the bridging-devices in the cluster.

Preferably, sending the BPDUs includes sending the BPDUs via an emulated port leading to an emulated link which is connected to substantially all the bridging-devices in the cluster. Preferably, the emulated link has a zero cost.

Preferably, determining the characteristic of the network includes determining information on a path to a root bridging-device. Preferably, determining the information on the path to the root includes selecting the emulated port as a root port if the emulated port is not a designated port of the emulated link. Alternatively or additionally, determining the information on the path to the root includes choosing a path common to substantially all the bridging-devices in the cluster.

Preferably, sending the BPDUs includes defining a VLAN and sending the BPDUs as a broadcast along the VLAN. Further preferably, sending the BPDUs includes sending the BPDUs without substantial delay between sending by the first bridging-device and receiving by the non-neighboring bridging-device. Preferably, sending the BPDUs includes sending BPDUs with a multicast destination address. Preferably, sending the BPDUs includes sending BPDUs substantially compatible with the 802.1D standard tree algorithm.

There is further provided in accordance with a preferred embodiment of the present invention, a method of activating links which form a spanning tree in a network formed of bridging-devices and links, the network including at least one cluster of cluster-member bridging-devices, external bridging-devices not included in the cluster and external links which directly connect to at least one external bridging-device, the method including sending messages between bridging-devices of the network, determining a link suitable for being part of the spanning tree which may be activated without forming a path of activated external links between two cluster-member bridging-devices of the at least one cluster, and activating the determined link.

Preferably, determining the link includes determining a root bridging-device and a lowest cost path to the root bridging-device from each of the bridging-devices in the network, the determined link being along a lowest cost path. Preferably, determining the lowest cost path includes assuming a zero cost path between any two cluster-member bridging-devices belonging to the same cluster.

There is further provided in accordance with a preferred embodiment of the present invention, a method of activating links of a network, including determining a plurality of links which form a spanning tree of the network, and activating at least one link irrespective of the determined plurality of links.

Preferably, activating the at least one link irrespective of the determined plurality of links includes activating the at least one link before the determining of the plurality of links. Alternatively or additionally, activating the at least one link irrespective of the determined plurality of links includes activating internal links of a cluster. Further alternatively or additionally, activating the at least one link irrespective of the determined plurality of links includes activating a link which connects two different clusters. Preferably, activating the link which connects two different clusters includes activating the link although it forms a loop in the network. Alternatively or additionally, activating the at least one link irrespective of the determined plurality of links includes activating the at least one link only for some types of messages. Preferably, activating the at least one link only for some types of messages includes activating the link for messages of a specific VLAN.

Preferably, activating the at least one link only for some types of messages includes activating the link for only some types of messages for a predetermined period and thereafter activating the at least one link for substantially all types of messages.

There is further provided in accordance with a preferred embodiment of the present invention, a method of activating links which form a spanning tree in a network formed of bridging-devices and links, the network including a cluster of cluster-member bridging-devices, external bridging-devices not included in the cluster and external links which directly connect to at least one external bridging-device, including sending messages between bridging-devices of the network, waiting in each bridging-device a hold-time between sending successive messages from the bridging device, and activating a plurality of links forming the spanning tree, the total time until the spanning tree is formed is substantially equal to the time required if the cluster were replaced by a single bridging-device.

Preferably, waiting the hold-time includes waiting in at least one of the bridging-devices, different hold-times dependent on an identity of the bridging-device to which the successive messages are sent.

Further preferably, waiting the hold-time includes waiting in cluster member bridging-devices, a first hold-time for messages sent to another cluster member bridging-device and a second, different, hold-time for messages sent to bridging-devices which are not cluster members.

Alternatively or additionally, sending the messages includes sending at least some of the messages by a first bridging device responsive to receiving information in messages from other bridging devices which information induces sending the messages, and waiting the hold-time includes waiting in the first bridging-device, different hold-times for different messages dependent on the identity of the bridging-device from which the information inducing sending a particular message was received.

There is further provided in accordance with a preferred embodiment of the present invention, a method of implementing a distributed spanning tree algorithm in a first bridging-device, including receiving a spanning-tree-algorithm message from a second bridging device, generating at least one message, including a message to a third bridging device, responsive to the received message, determining a hold-time to wait before sending the generated message to the third bridging device from a plurality of available hold-times, and sending the message after the hold-time.

Preferably, generating the message includes generating a BPDU message. Preferably, determining the hold-time includes determining the hold-time responsive to the identity of the second bridging-device. Further preferably, determining the hold-time includes determining the hold-time responsive to whether the second bridging-device belongs to a common cluster with the first bridging-device.

Alternatively or additionally, determining the hold-time includes determining the hold-time responsive to the identity of the third bridging-device. Preferably, determining the hold-time includes determining the hold-time responsive to whether the third bridging-device belongs to a common cluster with the first bridging-device.

In a preferred embodiment of the present invention, determining the hold-time includes determining a standard hold-time if both the second and third bridging-devices do not belong to a common cluster with the first bridging-device. Preferably, determining the hold-time includes determining a shortened hold-time if either the second or third bridging-devices belong to a common cluster with the first bridging-device.

There is further provided in accordance with a preferred embodiment of the present invention, a cluster-member switch, including a forwarding circuit, and a processor which runs a spanning tree algorithm code which generates and receives Bridge Protocol Data Units (BPDUs) in order to configure the forwarding circuit, and an intermediate software which alters at least some of the generated or received BPDUs.

Preferably, the intermediate software changes a destination address of the generated BPDUs to a broadcast, multicast or unknown unicast address. Alternatively or additionally, the intermediate software changes a VLAN field of the generated BPDUs to a predetermined VLAN identity.

Preferably, the intermediate software changes a port indication of some received BPDUs to an emulated port identity. Further preferably, the intermediate software reports a zero cost for the emulated port.

Preferably, the intermediate software changes an indication of the identity of a bridging-device sending at least one received BPDU. Further preferably, the intermediate software changes the indication of the identity of the sending bridging-device responsive to a required selection of a root port. Preferably, the intermediate software changes the indication of the identity of the sending bridging-device to a minimal or maximal value.

Preferably, the spanning tree algorithm (STA) code includes a standard STA code.

Preferably, the cluster bridging-device includes a switch-module of a modular switch.

BRIEF DESCRIPTION OF FIGURES

The invention will be more clearly understood by reference to the following description of preferred embodiments thereof in conjunction with the figures, wherein identical structures, elements or parts which appear in more than one figure are labeled with the same numeral in all the figures in which they appear, in which.

DETAILED DESCRIPTION OF THE PREFERRED EMBODIMENTS

Figure 1:
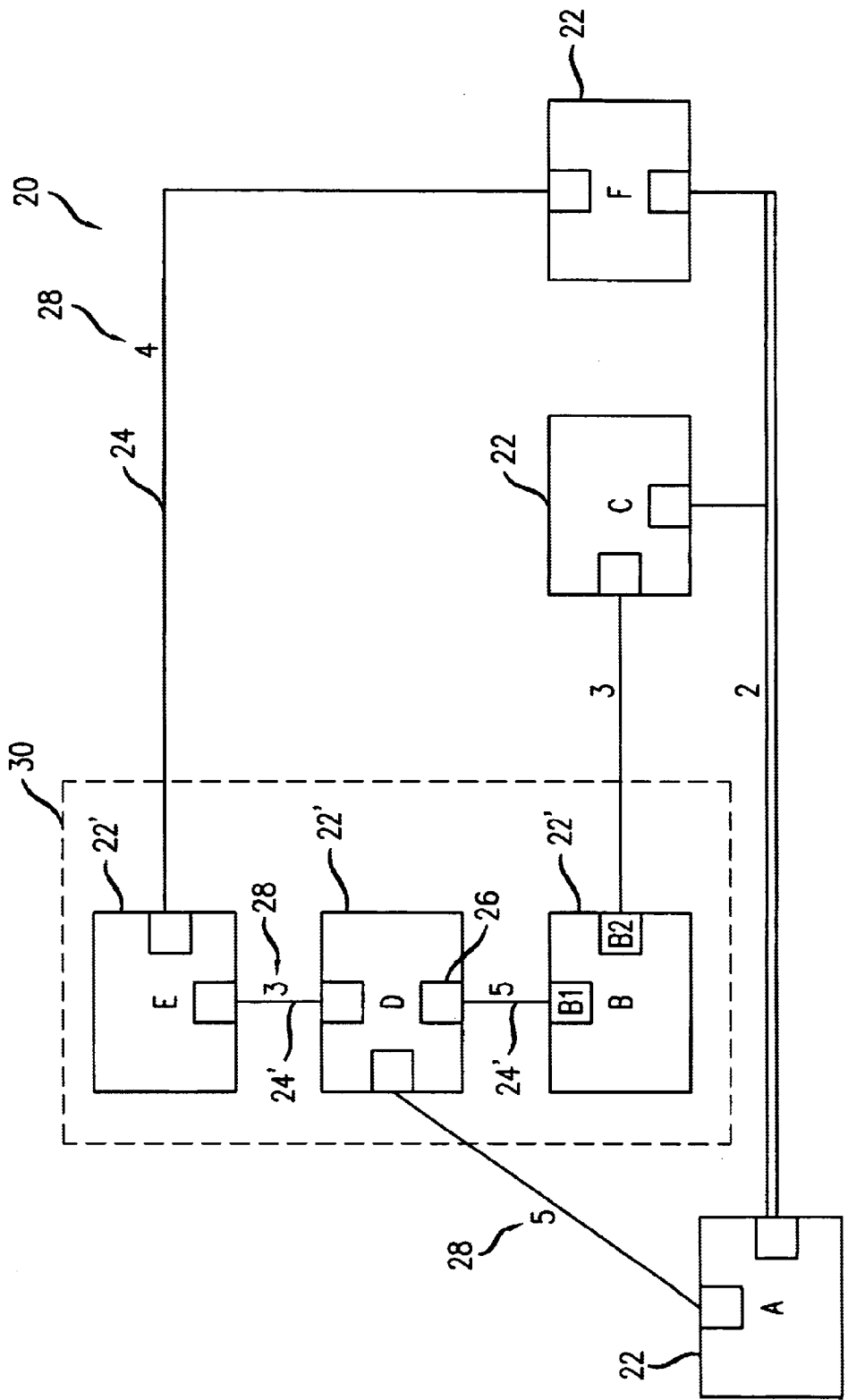
FIG. 1 is a schematic graph of a network including a cluster, in accordance with a preferred embodiment of the present invention.

FIG. 1 is a schematic graph of a network 20 including a cluster 30, in accordance with a preferred embodiment of the present invention. Network 20 comprises a plurality of bridging-devices 22 (including bridging-devices labeled 22') labeled A, B, C, D, E, and F, wherein precedence in the alphabet designates a higher bridging-device priority. Preferably, bridging-devices 22 comprise switches, switch modules, bridges, and/or any other entity which may participate in a spanning tree algorithm. Bridging-devices 22 are connected through links 24 which connect two or more bridging-devices. Each bridging-device 22 comprises, for each link 24 to which it is connected, a port 26 which serves as an interface to the link. Each port 26 preferably has an associated cost which represents the "cost" of passing messages over the link. Preferably, the cost of each link is the same for all the ports leading to the link. For example, the cost of a link may represent the bandwidth of the link. In FIG. 1 each link is marked with an exemplary cost 28, where to avoid confusion all the costs are below 20, the lowest reference number.

In FIG. 1, bridging-devices B, D and E belong to cluster 30 which in some respects operate as a single bridging-device. The bridging-devices 22 included in cluster 30 are referred to herein as cluster bridging-devices, and are labeled 22'. Likewise, links which are connected to two or more cluster bridging-devices are referred to herein as internal links and are labeled 24'. Links which are not internal links are referred to herein as external links. Likewise, bridging-devices which are not cluster bridging-devices are referred to herein as external bridging-devices. It is assumed herein that no external bridging-devices are connected to internal links.

Preferably, cluster 30 does not comprise a loop of internal links 24'. Alternatively or additionally, cluster 30 comprises a hardware or software mechanism (not shown) which automatically disconnects a link from cluster 30 when a loop is discovered in the cluster. Further alternatively or additionally, an internal STA is performed within cluster 30 for blocking in software redundant internal links 24'. The internal STA may be, for example, as described in U.S. patent application Ser. No. 09/061,484 filed Apr. 16, 1998, the disclosure of which is incorporated herein by reference.

Cluster 30 may comprise, for example, a modular switch which is formed internally from a group of switch modules, i.e., bridging-devices B, D and E. Alternatively or additionally, cluster 30 comprises a group of bridging-devices which internally implement a separate spanning tree algorithm.

Figure 2:
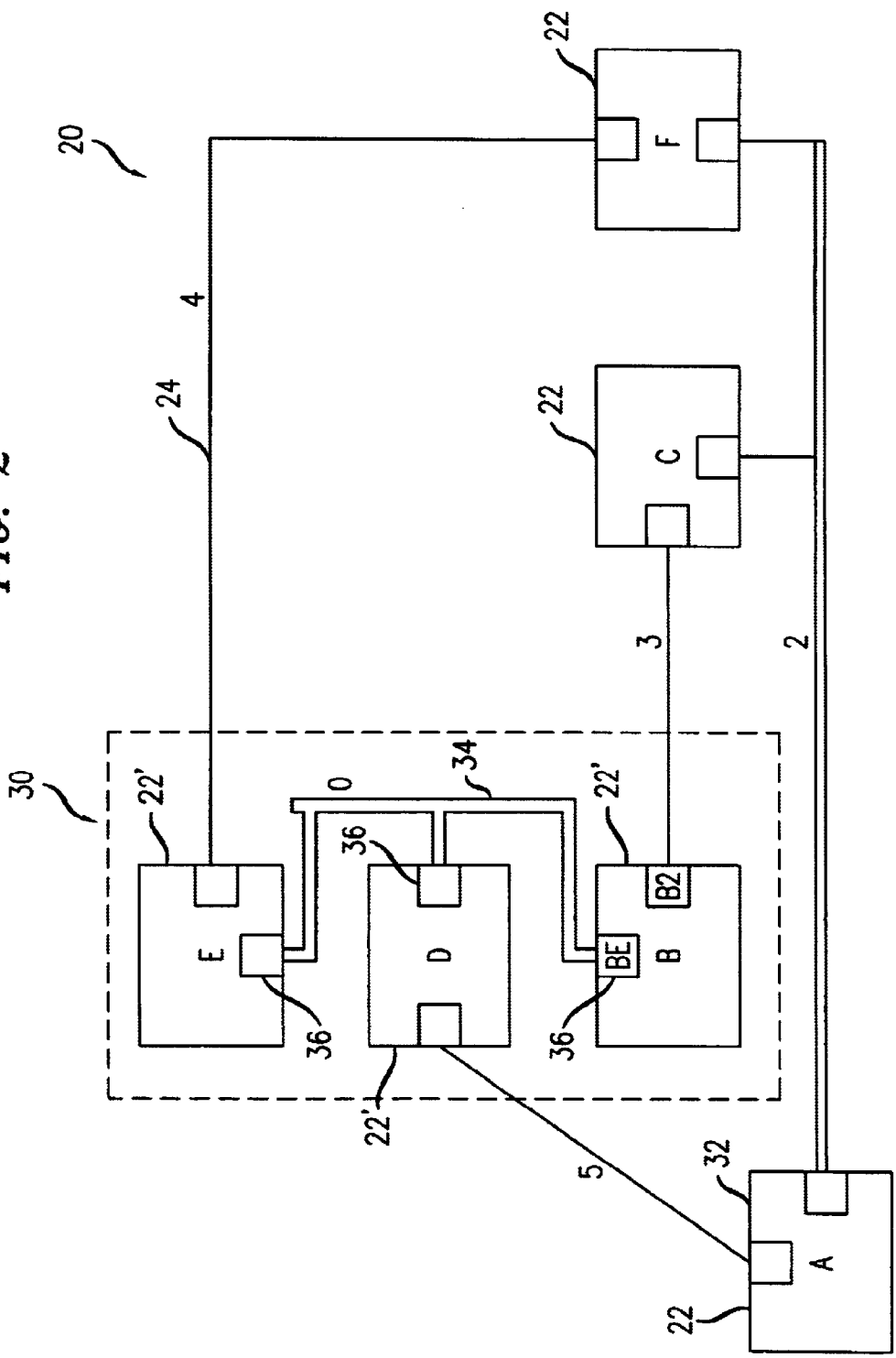
FIG. 2 is a schematic graph of the network of FIG. 1 as perceived by a spanning tree algorithm, in accordance with a preferred embodiment of the present invention.

FIG. 2 is a schematic graph of network 20 as perceived by a spanning tree algorithm (STA), in accordance with a preferred embodiment of the present invention. As perceived by an STA code within cluster bridging-devices 22', cluster bridging-devices 22' are connected by a single emulated link 34, instead of links 24' shown in FIG. 1. Each of cluster bridging-devices 22' comprises an emulated port 36 which leads to emulated link 34. Preferably, emulated ports 36 are assigned a zero cost.

According to the 802.1D STA, bridging-device A is chosen as a root 32 of the spanning tree. According to the STA the lowest cost path is chosen from each bridging-device 22 to the root 32, and this path is made active. In FIG. 2 there are three paths from each of the cluster bridging-devices 22' to the root. The paths include a path through bridging-devices E and F which has a cost of 6, a path through bridging-devices B and C which has a cost of 5, and a path through bridging-device D which has a cost of 5. Preferably, the STA is forced to choose, by the method described hereinbelow, the same path to root 32 from all of cluster bridging-devices 22'.

Because the cost of emulated link 34 is zero, the costs of the paths are the same for all of cluster bridging-devices 32. Therefore, each of cluster bridging-devices 32 chooses either the path through bridging-device D or the path through bridging-devices B and C, both of which paths have a cost of 5. In order to force cluster bridging-devices 22' to choose the same path, the path through the bridging-device having the designated port of emulated link 34, is chosen. According to the 802.1D STA, the designated port is chosen in the bridging-device of lowest priority which has the lowest cost path to root 32. In FIG. 2 the designated port of emulated link 34 is in bridging-device B (labeled BE). Therefore, the chosen path to root 32 passes through bridging-devices B and C. The 802.1D STA will result in having links ACF, BC, and BDE (emulated link 34) active, and links AD and EF blocked.

In comparison, using the standard 802.1D STA would result in having links ACF, BC, AD and EF active, and links DE and BD blocked. This result blocks internal links 24' and therefore looses at least some of the advantages of cluster-ing. Setting the costs of internal links 24' close to zero and using the standard 802.1D STA would result in having links ACF, BC, AD and DE active, and links EF and BD blocked. In both cases, the convergence time would also be longer than required in accordance with preferred embodiments of the invention, since, for example, information from bridging-device B would be delayed an extra second in bridging-device D on its way to bridging-device E. Therefore, the convergence time would be at least two seconds longer. For more complex clusters, the additional delay time would be even longer.

Figure 3:
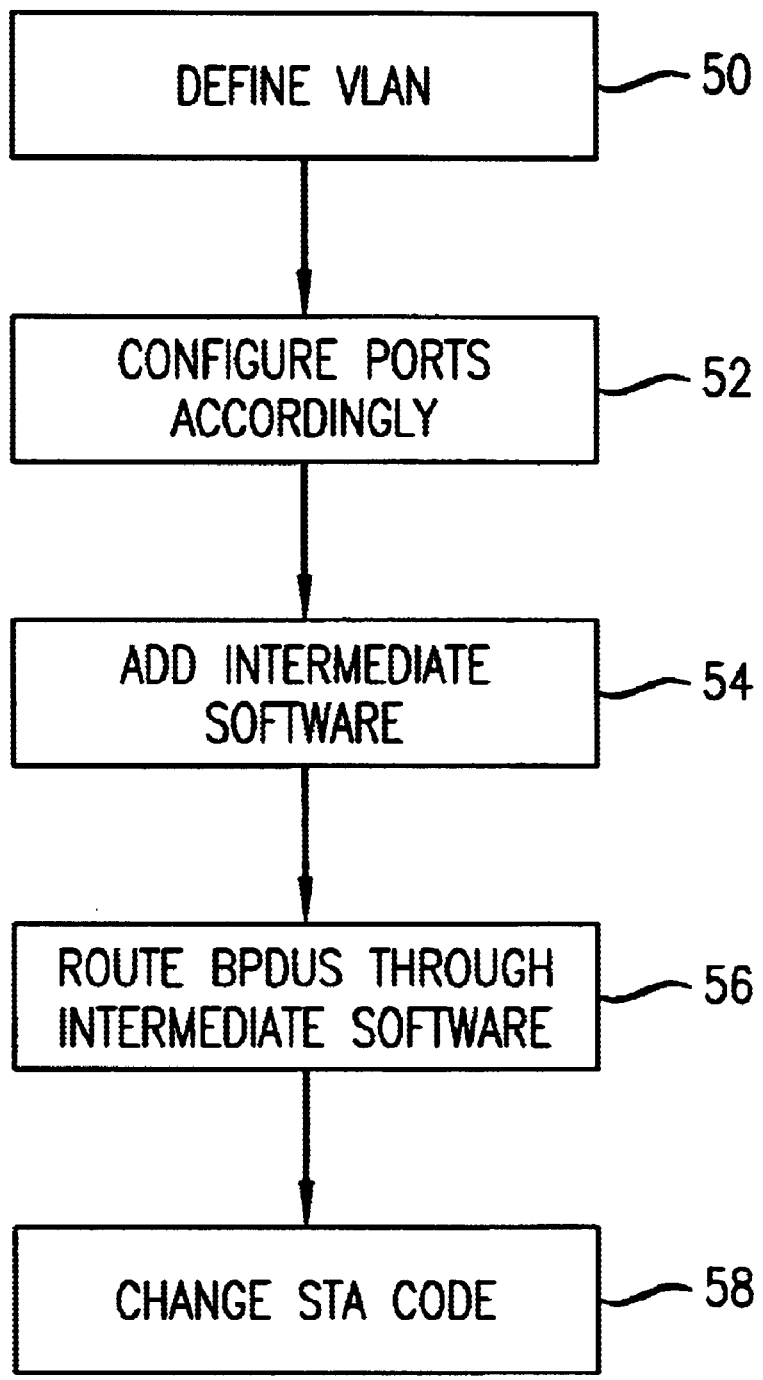
FIG. 3 is a flow chart of the changes performed in each of the cluster bridging-devices of a cluster in preparation for execution of a spanning tree algorithm, in accordance with a preferred embodiment of the present invention.

FIG. 3 is a flow chart of the changes performed in each of cluster bridging-devices 22' in preparation for execution of a spanning tree algorithm (STA), in accordance with a preferred embodiment of the present invention. A virtual local area network (VLAN) is defined (50) as connecting the bridging-devices included in cluster 30. Each of the internal ports of the bridging-device, i.e., ports which lead to internal links, are preferably configured (52) to forward packets belonging to the VLAN. The external ports of the bridging-device are preferably configured not to forward packets belonging to the VLAN. For example, port B1 leads to a link belonging to cluster 30 and therefore is configured to forward messages belonging to the VLAN. Port B2, on the other hand, leads to a link which is not internal to cluster 30 and therefore, port B2 is configured not to forward messages belonging to the VLAN.

Figure 4:
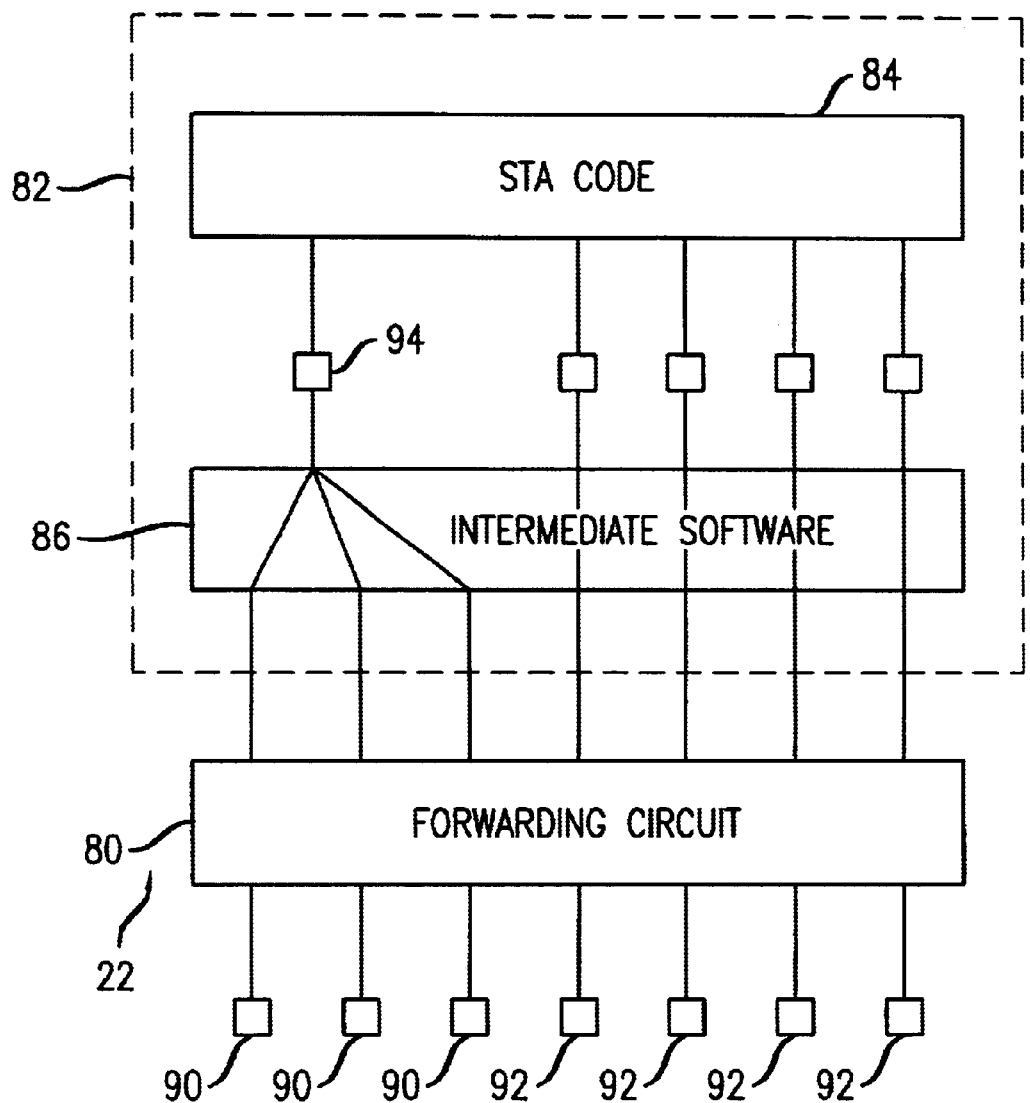
FIG. 4 is a schematic block diagram of the logical units of a cluster bridging-device, in accordance with a preferred embodiment of the present invention.

Reference is also made to FIG. 4, which is a schematic block diagram of the logical units of a cluster bridging-device 22', in accordance with a preferred embodiment of the present invention. Each bridging-device 22' preferably comprises, as is known in the art, a forwarding circuit 80 and a processor 82. Alternatively, forwarding circuit 80 is implemented as a software routine within processor 82. Forwarding circuit 80 receives the messages incident on the bridging-device. Received messages not addressed to the bridging-device are automatically forwarded by forwarding circuit 82 to other bridging-devices or non-bridging-devices in the network, according to configuration rules, without reference to processor 82. Broadcast and multicast messages which belong to a VLAN are forwarded through all the ports configured to belong to the VLAN. Broadcast and multicast messages are also forwarded to processor 82 if 30 the receiving bridging-device 22' is a member of the VLAN.

Control messages, such as BPDUs, are passed to processor 82 which configures the operation of forwarding circuit 80 according to the contents of the control messages.

Preferably, BPDUs are passed to processor 82 along with indication of the port from which the message was received and the associated cost of the port. Alternatively or additionally, the costs associated with the ports 26 are passed from forwarding circuit 80 to processor 82 at startup, periodically and/or responsive to configuration changes.

Forwarding circuit 80 sends and receives messages through one or more ports 26. Ports 26 preferably comprise, as described above, internal ports 90 which lead to internal links 24' and external ports 92 which lead to external links 24.

Processor 82 preferably runs an STA code 84 which preferably implements the 802.1D standard STA. Alternatively, STA code 84 implements any other distributed STA which is based on sending control messages between neighboring bridging-devices. STA code 84 uses incoming BPDUs received from other bridging-devices 22 and 22', to determine which of ports 26 are to forward messages, and which are to be blocked, i.e., are to forward only STA BPDUs. In addition, STA code 84 generates outgoing BPDUs which are sent to other bridging-devices 22 and 22' in network 20. It is noted that STA code 84 receives substantially all its knowledge on the connectivity of network 20 from the BPDUs it receives. STA code 84 also receives from forwarding circuit 80 a list of the operational ports 26 of the bridging-device. Preferably, the list is received at start up and whenever there is a change in the list an appropriate message is passed from forwarding circuit 80 to processor 82.

Preferably, an intermediate software layer 86 is added (54) to processor 82 between STA code 84 and forwarding logic 80. Preferably, intermediate software 86 buffers the passage of control messages between forwarding circuit 80 and STA code 84. Intermediate software 86 alters some of the incoming and/or outgoing BPDUs in order to make STA code 84 operate as if all cluster bridging-devices 22' are connected through emulated link 34 via a single emulated port 94.

Preferably, intermediate software 86 also changes the list of ports 26 of the bridging-device, presented to STA code 84. All the internal ports 90 are replaced in the list by emulated port 94. The cost of emulated port 94 is preferably set to zero so that the emulated port is not blocked by the STA, as explained further hereinbelow. Any messages to STA code 84 referencing internal ports 90, for example reporting changes in the operation of internal ports 90, are preferably discarded by intermediate software 86.

Preferably, intermediate software 86 activates all of internal ports 90 immediately at start-up and keeps them active at substantially all times. To this end, intermediate software 86 preferably knows which ports 26 are internal ports 90 and which are external ports 92. This behavior is contrary to the 802.1D STA which requires that all ports remain blocked for an initial period after startup. It is noted, however, that only internal ports 90 are activated at startup and therefore there is no danger that a loop will be formed. The changes illustrated by FIG. 3, ensure that a loop is not formed in network 20 at a later stage, although internal ports 90 are always active. It is noted that when BPDU messages are sent as multicast messages it is necessary to activate all internal ports 90 in order to ensure that the BPDUs reach all the cluster bridging-devices 22'.

Preferably, all messages directed to processor 82 are passed to a driver (not shown) within the processor, which passes the messages to processes, such as STA code 84, running on processor 82. Preferably, all the messages incident on bridging device 22' are routed (56) to intermediate software 86, directly from forwarding circuit 80 or through the driver. Alternatively or additionally, only BPDUs and messages related to the list of ports 90 and 92 are routed through intermediate software 86. Further alternatively or additionally, BPDUs received from external ports 92 are passed directly to STA code 84, while BPDUs received through internal ports 90 are routed through intermediate software 86.

Preferably, intermediate software 86 alters outgoing BPDUs which are addressed to the emulated port. The destination address of the BPDU, which denotes that the message is a BPDU, is preferably replaced by a broadcast or multicast address. The VLAN field of the BPDU is preferably set to the local VLAN defined for cluster 30. Thus, the outgoing BPDU is sent to all the bridging-devices of cluster 30, as if the bridging-devices were connected along a single link.

Preferably, the destination address is set to a multicast address used only for BPDUs passing on the emulated link 34. Alternatively or additionally, the destination address is set to a multicast address used in the local VLAN of cluster 30 only for BPDUs. Preferably, intermediate software 86 and/or the driver identify the BPDUs with altered addresses according to the unique multicast destination address. Alternatively or additionally, the local VLAN of cluster 30 is used only for BPDUs and therefore messages sent on the local VLAN are known to be BPDUs. Further alternatively or additionally, the BPDUs with altered addresses are identified according to their internal message structure which is unique to BPDUs.

Preferably, the address field of incoming BPDUs from internal ports 90 are changed by intermediate software 86 to the standard BPDU address and are tagged as coming through emulated port 94. The address is preferably changed to the standard BPDU address to prevent problems in case STA code 84 performs a sanity check on the BPDUs it receives.

It is noted that if the STA code uses VLANs for any other purpose, such as implementing multiple spanning tree algorithms, intermediate software 86 appends the original VLAN information to the BPDUs it sends using the cluster VLAN.

Alternatively to defining a VLAN, intermediate software 86 replaces outgoing BPDUs directed through the emulated port, with a plurality of messages addressed to each of the cluster bridging-devices 22'.

STA code 84 is preferably changed (58), such that when two or more paths from the cluster bridging-device 22' to the root have the same cost, the root port is chosen such that all the cluster bridging-devices 22' choose the same root path. Preferably, if one of the paths passes through the emulated port and the emulated port in the local bridging-device is not the designated port of the emulated link, the emulated port is chosen as the root port. Otherwise, an external port is chosen as the root port according to the standard rules of the STA.

Alternatively to changing STA code 84, intermediate software 86 reads the BPDUs which pass through it to determine whether its emulated port 94 should be the designated port. Preferably, if emulated port 94 should not be the designated port, the bridging-device ID field of all the BPDUs received through emulated port 94 is set to the lowest possible value. Thus, in case two paths to the root have the same cost, the low bridging-device ID value will make STA code 84 choose the path through emulated port 94. Further preferably, if emulated port 94 should be the designated port, the bridging-device ID field of all the BPDUs received through emulated port 94 is set to the highest possible value. Thus, in case two paths to the root have the same cost, the high bridging-device ID value will prevent STA code 84 from choosing the path through emulated port 94. Alternatively or additionally, the bridging-device ID field of the BPDUs are changed before they are sent.

These alternatives are especially useful when the STA code 84 of a cluster bridging-device 22' cannot be changed or when such change is very laborious. For example, when the STA code is received by a user without documentation and/or in compiled form.

In some preferred embodiments of the present invention, the hold-time waited by cluster bridging-devices 22' between sending consecutive BPDUs is defined in STA code 84 as about half a second, rather than the standard full second. Information propagating through the network and passing through cluster 30 is delayed at most twice within the cluster. The information is delayed for a first hold-time at the cluster bridging-device which receives the information and for a second hold-time at any other cluster bridging-device, since information received by a cluster bridging-device is passed to all the other cluster bridging-devices, as though they were directly connected. Using a hold-time of half a second in cluster bridging-devices 22' results in a total hold-time delay in cluster 30 of up to a second, substantially the same as the hold-time in a regular bridging-device 22.

Alternatively or additionally, cluster bridging-devices 22' use different hold-times for different BPDUs they send and/or receive. Preferably, BPDUs sent to and/or received through emulated port 94 are delayed for a hold-time of half a second while other BPDUs are delayed for a full second. Thus, the delay incurred by cluster 30 on substantially all the information passing through the cluster is about a second.

Figure 5:
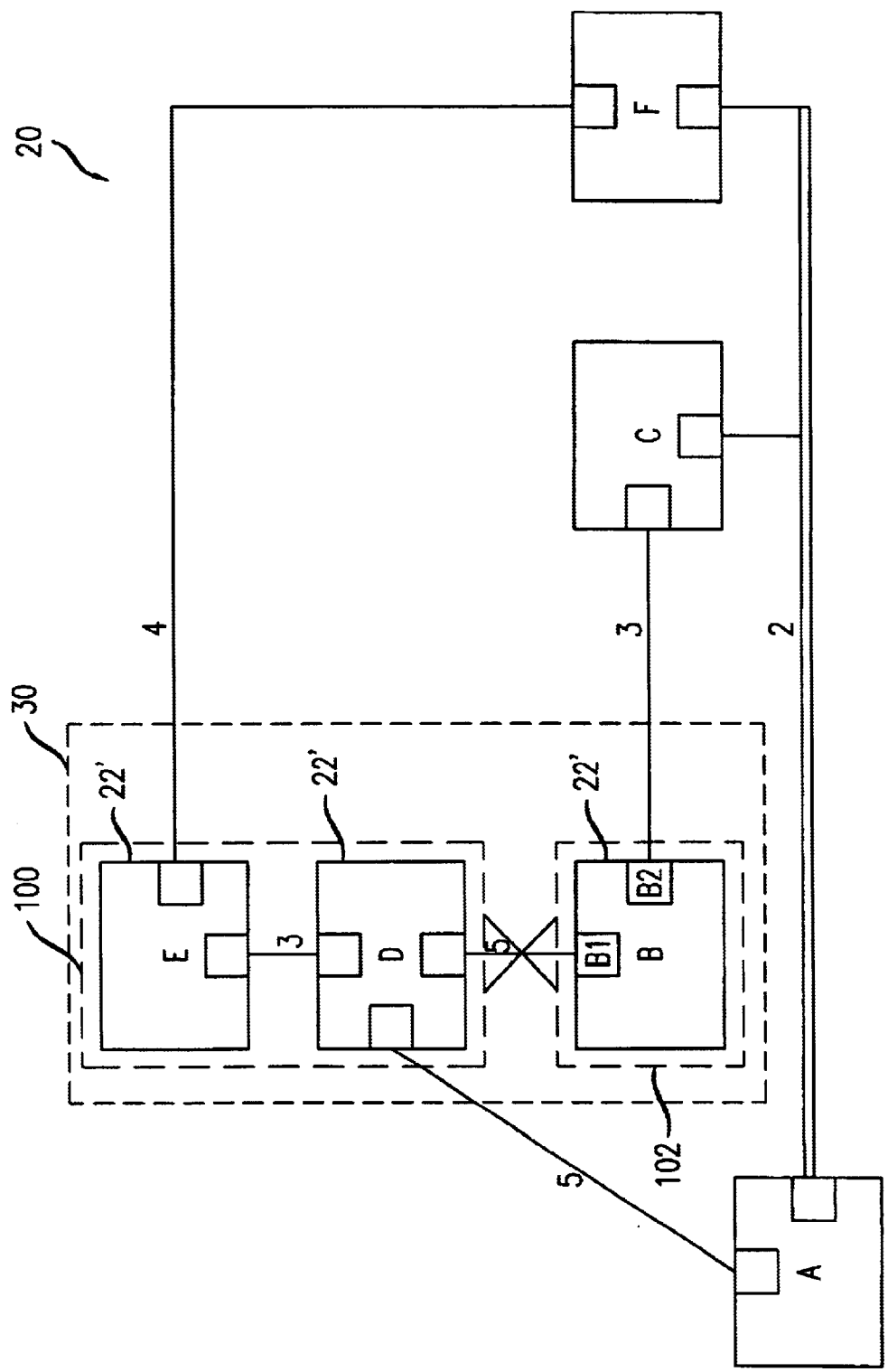
FIG. 5 is a schematic graph of the network of FIG. 1 in which an internal link of the cluster, failed.

FIG. 5 is a schematic graph of network 20 in which a link of cluster 30 failed. Assuming link BD failed for some reason, cluster 30 is broken into two clusters, a cluster 100 including bridging-devices D and E and a cluster 102 including bridging-device B. The spanning tree is recalculated and link AD will be activated. If after a while link BD is operative, link BD may be reactivated in order to unite clusters 100 and 102 into a single cluster 30.

In a preferred embodiment of the present invention, intermediate software 86, or any other hardware or software entity of cluster bridging-devices 22', always activates newly-operating internal links, such as link BD, even though such activation may form a loop (In FIG. 5, the loop is formed of bridging-devices ADBC). The STA will find the loop and disconnect it within a few seconds.

Alternatively, in order to prevent the formation of an operational loop even for a few seconds, intermediate software 86 sets newly-operating links (BD) to forward only messages belonging to the defined cluster VLAN, for an intermediate period. After the intermediate period, the newly-operating link (BD) is moved to full active state. Thus, a loop is formed during the intermediate period only for the BPDUs. This BPDU-loop forces the STA to recalculate a spanning tree which will include emulated link 34 as depicted in FIG. 2, and does not include a loop (link AD is blocked).

Preferably, the intermediate period is long enough (about 20 seconds) to ensure that the BPDU-loop was disconnected, i.e., link AD was blocked, before the newly-operating link is moved to full forwarding state. Alternatively or additionally, at the beginning of the intermediate period, a special message is sent along the VLAN to all the cluster bridging-devices 22' requesting that all bridging-devices immediately send their current BPDUs along the emulated internal port. Thus, the intermediate period may be shortened to about 1 second. Preferably, in order to ensure that all the cluster bridging-devices received the special message and the response BPDUs, the special message and the response BPDUs are repeated a few times.

In a preferred embodiment of the present invention, not all the cluster bridging-devices send their BPDUs in response to the special message. As the cluster bridging-devices 22' which had designated ports of the emulated links of clusters 100 and 102 carry the most up to date spanning tree information, only these bridging-devices send their BPDUs in response to the special message.

It will be appreciated that the above described methods may be varied in many ways, including, changing the order of steps, which steps are performed on-line or off-line and the exact implementation used. It should also be appreciated that the above described description of methods and apparatus are to be interpreted as including apparatus for carrying out the methods and methods of using the apparatus.

The present invention has been described using non-limiting detailed descriptions of preferred embodiments thereof that are provided by way of example and are not intended to limit the scope of the invention. Variations of embodiments described will occur to persons of the art. Furthermore, the terms "comprise," include," and "have" or their conjugates, shall mean, when used in the claims, "including but not necessarily limited to. The scope of the invention is limited only by the following claims.

What is claimed is:

1. A method of implementing a distributed algorithm which is based on sending Bridge Protocol Data Units (BPDUs) only between neighboring bridging-devices in a network, comprising:

sending BPDUs from a first bridging-device of the network to at least one second bridging-device;

determining, in the second bridging-device, information relating to a topology characteristic of the network responsive to the BPDUs; and forwarding the "BDPUs" from the second bridging-device to at least one third bridging-device;

wherein the network comprises at least one cluster having cluster member bridging-devices, the cluster member bridging-devices comprising, at least one of the first bridging-device, second bridging-devices and third bridging-device," and wherein sending the BPDUs comprises sending the BPDUs from a cluster member bridging-device to substantially all the bridging-devices in the cluster; and wherein sending the BPDUs comprises sending the BPDUs via an emulated port leading to an emulated link which is connected to substantially all the bridging-devices in the cluster.

2. A method according to claim 1, wherein the emulated link has a zero cost.

3. A method according to claim 1, wherein determining the characteristic of the network comprises determining information on a path to a root bridging-device.

4. A method according to claim 3, wherein determining the information on the path to the root comprises selecting the emulated port as a root port if the emulated port is not a designated port of the emulated link.

5. A method according to claim 3, wherein determining the information on the path to the root comprises choosing a path common to substantially all the bridging-devices in the cluster.

6. A method according to claim 1, wherein sending the BPDUs comprises defining a VLAN and sending the BPDUs as a broadcast along the VLAN.

7. A method according to claim 1, wherein sending the BPDUs comprises sending the BPDUs without substantial delay between sending by the first bridging-device and receiving by the at least one second bridging device.

8. A method according to claim 1, wherein sending the BPDUs comprises sending BPDUs with a multicast destination address.

9. A method according to claim 1, wherein sending the BPDUs comprises sending BPDUs substantially compatible with the 802.1D standard tree algorithm.

10. A method of activating links which form a spanning tree in a network formed of bridging-devices and links, the network including at least one cluster of cluster-member bridging-devices, external bridging-devices not included in the cluster and external links which directly connect to at least one external bridging-device, comprising:

sending messages between bridging-devices of the network;

determining a link suitable for being part of the spanning tree which may be activated without forming a path of activated external links between two cluster-member bridging-devices of the at least one cluster; and activating the determined link.

11. A method according to claim 10, wherein determining the link comprises determining a root bridging-device and a lowest cost path to the root bridging-device from each of the bridging-devices in the network, the determined link being along a lowest cost path.

12. A method according to claim 11, wherein determining the lowest cost path comprises assuming a zero cost path between any two cluster-member bridging-devices belonging to the same cluster.

13. A method of activating links of a network, comprising:

determining a plurality of links which form a spanning tree of the network; and activating at least one link irrespective of the determined plurality of links, wherein activating the at least one link irrespective of the determined plurality of links comprises activating a link which connects two different clusters and further wherein activating the link which connects two different clusters comprises activating the link although it forms a loop in the network.

14. A method according to claim 13, wherein activating the at least one link irrespective of the determined plurality of links comprises activating the at least one link only for some types of messages.

15. A method according to claim 14, wherein activating the at least one link only for some types of messages comprises activating the link for messages of a specific VLAN.

16. A method according to claim 14, wherein activating the at least one link only for some types of messages comprises activating the link for only some types of messages for a predetermined period and thereafter activating the at least one link for substantially all types of messages.

17. A method according to claim 13, wherein activating the at least one link irrespective of the determined plurality of links comprises activating the at least one link before the determining of the plurality of links.

18. A method according to claim 13, wherein activating the at least one link irrespective of the determined plurality of links comprises activating internal links of a cluster.

19. A method of activating links which form a spanning tree in a network formed of bridging-devices and links, the network including a cluster of cluster-member bridging-devices, external bridging-devices not included in the cluster and external links which directly connect to at least one external bridging-device, comprising:

sending messages between bridging-devices of the network;

waiting in each bridging-device a hold-time between sending successive messages from the bridging-device; and activating a plurality of links forming the spanning tree, wherein the total time until the spanning tree is formed is substantially equal to the time required if the cluster were replaced by a single bridging-device.

20. A method according to claim 19, wherein waiting the hold-time comprises waiting in at least one of the bridging-devices, different hold-times dependent on an identity of the bridging-device to which the successive messages are sent.

21. A method according to claim 20, wherein waiting the hold-time comprises waiting in cluster member bridging-devices, a first hold-time for messages sent to another cluster member bridging-device and a second, different, hold-time for messages sent to bridging-devices which are not cluster members.

22. A method according to claim 19, wherein sending the messages comprises sending at least some of the messages by a first bridging device responsive to receiving information in messages from other bridging devices which information induces sending the messages, and waiting the hold-time comprises waiting in the first bridging-device, different hold-times for different messages dependent on the identity of the bridging-device from which the information inducing sending a particular message was received.

23. A method according to claim 24, wherein generating the message comprises generating a BPDU message.

24. A method of implementing a distributed spanning tree algorithm in a first bridging-device, comprising:

receiving a spanning-tree-algorithm message from a second bridging-device;

generating at least one message, including a message to a third bridging-device, responsive to the received message;

determining a hold-time to wait before sending the generated message to the third bridging-device, from a plurality of available hold-times; and sending the message after the hold-time, wherein determining the hold-time comprises determining the hold-time responsive to the identity of at least one of the second bridging-device and the third bridging-device.

25. A method according to claim 24, wherein determining the hold-time comprises determining the hold-time responsive to whether the second bridging-device belongs to a common cluster with the first bridging-device.

26. A method according to claim 24, wherein determining the hold-time comprises determining the hold-time responsive to the identity of the third bridging-device.

27. A method according to claim 26, wherein determining the hold-time comprises determining the hold-time responsive to whether the third bridging-device belongs to a common cluster with the first bridging-device.

28. A method of implementing a distributed spanning tree algorithm in a first bridging-device, comprising:

receiving a spanning-tree-algorithm message from a second bridging-device;

generating at least one message, including a message to a third bridging-device, responsive to the received message;

determining a hold-time to wait before sending the generated message to the third bridging-device, from a plurality of available hold-times; and sending the message after the hold-time, wherein determining the hold-time comprises determining a standard hold-time if both the second and third bridging-devices do not belong to a common cluster with the first bridging-device.

29. A method according to claim 28, wherein determining the hold-time comprises determining a shortened hold-time if either the second or third bridging-devices belong to a common cluster with the first bridging-device.

30. A cluster-member switch, comprising:

a forwarding circuit; and a processor which runs a spanning tree algorithm code which generates and receives Bridge Protocol Data Units (BPDUs) in order to configure the forwarding circuit, and an intermediate software which alters at least some of the generated or received BPDUs, wherein the processor further determines a link suitable for being part of the spanning tree which may be activated without forming a path of activated external links between the cluster-member switch and at least one other cluster-member switch.

31. A cluster-member switch according to claim 30, wherein the intermediate software changes a destination address of the generated BPDUs to a broadcast, multicast or unknown unicast address.

32. A cluster-member switch according to claim 30, wherein the intermediate software changes a VLAN field of the generated BPDUs to a predetermined VLAN identity.

33. A cluster-member switch according to claim 30, wherein the intermediate software changes a port indication of some received BPDUs to an emulated port identity.

34. A cluster-member switch according to claim 33, wherein the intermediate software reports a zero cost for the emulated port.

35. A cluster-member switch according to claim 30, wherein the intermediate software changes an indication of the identity of a bridging-device sending at least one received BPDU.

36. A cluster-member switch according to claim 35, wherein the intermediate software changes the indication of the identity of the sending bridging-device responsive to a required selection of a root port.

37. A cluster-member switch according to claim 35, wherein the intermediate software changes the indication of the identity of the sending bridging-device to a minimal or maximal value.

38. A cluster-member switch according to claim 30, wherein the spanning tree algorithm (STA) code comprises a standard STA code.

39. A cluster-member switch according to claim 30, wherein the cluster bridging-device comprises a switch-module of a modular switch.

40. A method according to claim 1, wherein sending the BPDUs to the at least one second bridging-device and forwarding the BPDUs to the third bridging-device comprise sending and forwarding along links belonging to a common VLAN.

41. A method according to claim 1, wherein the at least one second bridging-device comprises a non-neighboring bridging device.

* * * * *

UNITED STATES PATENT AND TRADEMARK OFFICE
CERTIFICATE OF CORRECTION

PATENT NO. : 6,724,734 B1
DATED : April 20, 2004
INVENTOR(S) : Shabtay et al.

Page 1 of 1

It is certified that error appears in the above-identified patent and that said Letters Patent is hereby corrected as shown below:

<u>Column 14,</u>
Line 18, " "BDPUs" " should be -- BPDUs --.
Line 22, delete "," after "comprising".
Line 23, "devices" should be -- device --.
Line 24, please delete quotation mark.

Signed and Sealed this

Fifteenth Day of June, 2004

JON W. DUDAS
*Acting Director of the United States Patent and Trademark Office*